United States Patent
Burghardt et al.

(10) Patent No.: US 9,995,154 B2
(45) Date of Patent: Jun. 12, 2018

(54) METHOD FOR PRODUCING A ROTOR WHEEL AND A ROTOR

(71) Applicant: Robert Bosch GmbH, Stuttgart (DE)

(72) Inventors: Andreas Burghardt, Stuttgart (DE); Bernd Reinsch, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 470 days.

(21) Appl. No.: 14/576,182

(22) Filed: Dec. 18, 2014

(65) Prior Publication Data

US 2015/0176416 A1 Jun. 25, 2015

(30) Foreign Application Priority Data

Dec. 19, 2013 (DE) .......... 10 2013 226 594

(51) Int. Cl.
*B23K 31/02* (2006.01)
*F01D 5/30* (2006.01)
*B23K 1/00* (2006.01)
*B23K 101/00* (2006.01)

(52) U.S. Cl.
CPC .......... *F01D 5/3061* (2013.01); *B23K 1/0018* (2013.01); *B23K 2201/001* (2013.01); *F05D 2220/40* (2013.01); *F05D 2230/239* (2013.01); *F05D 2300/174* (2013.01); *F05D 2300/2118* (2013.01); *Y10T 156/10* (2015.01)

(58) Field of Classification Search
CPC .......... F01D 5/3061; Y10T 156/10; F05D 2300/2118; F05D 2300/174; F05D 2220/40; F05D 2230/239; B23K 1/0008; B23K 1/0018; B23K 2201/001; B23K 1/19; B23K 1/20

USPC .......... 228/214–215, 262.71–262.72, 119, 228/245–262; 29/889.1–889.722

See application file for complete search history.

(56) References Cited

U.S. PATENT DOCUMENTS

| | | | |
|---|---|---|---|
| 4,723,862 A | 2/1988 | Ito et al. | |
| 5,314,106 A | 5/1994 | Ambroziak et al. | |
| 5,558,922 A * | 9/1996 | Gupta | C23C 4/02 29/889.1 |

(Continued)

FOREIGN PATENT DOCUMENTS

DE 10 2008 059 617 A1 6/2010
DE 10 2010 011 486 A1 9/2011

(Continued)

*Primary Examiner* — Kiley Stoner
(74) *Attorney, Agent, or Firm* — Maginot, Moore & Beck LLP

(57) ABSTRACT

A method for producing a component, in particular a rotor wheel, includes positioning a main body, a fusion-weldable attachment layer, and a barrier layer. The main body has a first alloy in an attachment region. The fusion-weldable attachment layer is positioned in the attachment region of the main body and has a second alloy which differs from the first alloy. The barrier layer is positioned between the main body and the fusion-weldable attachment layer. The barrier layer is configured to prevent a reaction of the first alloy of the main body with the second alloy of the fusion-weldable attachment layer during a thermal treatment. The method further includes heating the main body, the barrier layer, and the fusion-weldable attachment layer to connect the main body, the barrier layer, and the fusion-weldable attachment layer to one another.

20 Claims, 3 Drawing Sheets

(56) References Cited

U.S. PATENT DOCUMENTS

| | | | | |
|---|---|---|---|---|
| 5,630,314 | A * | 5/1997 | Kojima | C23C 4/02 416/241 B |
| 6,117,560 | A * | 9/2000 | Maloney | C23C 14/083 416/241 B |
| 6,209,199 | B1 * | 4/2001 | Cornu | B23P 15/008 29/889.7 |
| 6,455,167 | B1 * | 9/2002 | Rigney | C23C 28/00 416/241 R |
| 6,858,334 | B1 * | 2/2005 | Gorman | C04B 35/486 416/241 B |
| 6,887,595 | B1 * | 5/2005 | Darolia | C04B 35/486 416/241 B |
| 6,896,977 | B2 * | 5/2005 | Nishimura | B23K 35/0238 165/177 |
| 6,899,522 | B2 | 5/2005 | Baur et al. | |
| 6,921,014 | B2 * | 7/2005 | Hasz | C23C 26/02 228/122.1 |
| 7,078,073 | B2 * | 7/2006 | Rigney | C23C 26/00 29/889.1 |
| 7,094,450 | B2 * | 8/2006 | Nagaraj | C23C 4/00 29/889.1 |
| 8,876,481 | B2 * | 11/2014 | Huang | F01D 5/282 29/458 |
| 2005/0142393 | A1 * | 6/2005 | Boutwell | B82Y 30/00 428/701 |
| 2007/0160859 | A1 * | 7/2007 | Darolia | F01D 5/288 428/469 |
| 2007/0164376 | A1 * | 7/2007 | Burrows | H01L 23/562 257/412 |
| 2007/0210459 | A1 * | 9/2007 | Burrows | H01L 23/564 257/790 |
| 2008/0166548 | A1 * | 7/2008 | Harada | C22C 19/03 428/336 |
| 2008/0199313 | A1 * | 8/2008 | Nitta | F01D 5/026 415/216.1 |
| 2009/0169915 | A1 * | 7/2009 | Takahashi | B32B 37/06 428/611 |
| 2011/0096443 | A1 * | 4/2011 | Zhang | C23C 14/165 360/324.2 |
| 2012/0244383 | A1 * | 9/2012 | Meschter | C04B 41/009 428/633 |
| 2013/0008027 | A1 * | 1/2013 | Franchet | B21D 53/78 29/889.71 |
| 2014/0242411 | A1 * | 8/2014 | Witz | F01D 5/288 428/623 |
| 2015/0028220 | A1 * | 1/2015 | Poppi | C23C 28/322 250/423 R |
| 2015/0071772 | A1 * | 3/2015 | Bullinger | C23C 4/02 415/177 |
| 2015/0108203 | A1 * | 4/2015 | Elliot | B23K 1/0016 228/121 |
| 2015/0233256 | A1 * | 8/2015 | Anand | F01D 5/284 428/623 |
| 2015/0275678 | A1 * | 10/2015 | Bullinger | B23P 6/002 416/241 R |

FOREIGN PATENT DOCUMENTS

| | | | |
|---|---|---|---|
| EP | 1 002 935 A1 | 5/2000 | |
| EP | 1321542 A1 * | 6/2003 | ........... C04B 35/486 |
| FR | 2 636 621 A1 | 12/1990 | |
| FR | 2979015 A1 * | 8/2011 | |
| WO | 2013/080828 A1 | 6/2013 | |

* cited by examiner

US 9,995,154 B2

METHOD FOR PRODUCING A ROTOR WHEEL AND A ROTOR

This application claims priority under 35 U.S.C. § 119 to patent application no. DE 10 2013 226 594.8, filed on Dec. 19, 2013 in Germany, the disclosure of which is incorporated herein by reference in its entirety.

BACKGROUND

The present disclosure relates to a method for producing a component, in particular a rotor wheel, to a component, in particular a rotor wheel, to a method for producing a component composite, in particular a rotor, and also to a component composite, in particular a rotor.

For modern internal combustion engines, use is increasingly being made of exhaust-gas turbochargers, in order to realize considerably more economical and nevertheless dynamic and convenient diesel and petrol engines. Nickel (Ni) base alloys are used at present as the material for the exhaust-gas-side turbine wheel. To improve the dynamics, alloys based on titanium aluminides (TiAl) are increasingly coming into consideration, these being distinguished by a low density (~4 g/cm$^3$) and a high specific strength. Turbine wheels made of TiAl base alloys can be produced, for example, by investment casting methods or metal injection molding (MIM). A major challenge is to attach the TiAl turbine wheel to the steel shaft, which connects the turbine wheel to the compressor wheel on the air side.

Fusion welding methods, e.g. electron or laser beam welding, are currently the established way of joining turbine wheels made of Ni base alloys to the steel shaft on account of a short cycle time and a high reliability of the joint. However, the pronounced formation of brittle phases between Ti, Fe and Al prevents these welding methods from being transferred for joining turbine wheels made of TiAl base alloys to steel.

To solve this problem, it is possible for intermediate pieces which are made of Ni base alloys and which can be welded to steel to be attached to the TiAl turbine wheel, e.g. by diffusion welding or friction welding. However, these approaches are time-consuming and costly. Furthermore, an intermediate layer which is made of an Ni base alloy and which can be welded to steel can be applied by powder spraying methods, e.g. by plasma spraying, high-velocity flame spraying or cold spraying. These methods are likewise costly and utilize the expensive powders used only to a small extent. In addition, no metallurgical connection is made between the TiAl base alloy and the intermediate layer made of an Ni base alloy in these methods. It is not possible to attach the intermediate layer made of an Ni base alloy to the TiAl turbine wheel by co-sintering on account of the various melting ranges of TiAl and Ni base alloys and the high tendency of Ni base alloys to react with TiAl base alloys.

DE 10 2010 011 486 A1 describes an exhaust-gas turbocharger which, in order to attach the turbine wheel to the shaft, has, at least between said turbine wheel and the shaft, at least one porous metallic or ceramic intermediate piece connected to the turbine wheel and/or the shaft by way of an infiltration process.

SUMMARY

The disclosure relates to a method for producing a component, in particular a rotor wheel, and to a component, in particular a rotor wheel. The disclosure also relates to a method for producing a component composite, in particular a rotor, and to a component composite, in particular a rotor. Advantageous configurations become apparent from the respective dependent claims and the description below.

The method according to the disclosure provides a component, in particular a (turbine) rotor wheel, which can be produced in a very simple manner and can be attached to a further component, in particular a steel shaft, in a reliable, fast and cost-effective manner by means of a fusion welding method. According to the disclosure, this is achieved in particular by the provision of a barrier layer, which, on account of its properties, is designed to prevent a reaction of the atoms of a first alloy of a main body with the atoms of a second alloy of a fusion-weldable attachment layer during a thermal treatment. In other words, that is to say that the barrier layer according to the disclosure effectively prevents the interdiffusion of the types of atom from the first alloy to the second alloy. At the same time, the barrier layer enters into a fixed connection during a thermal treatment, in particular during the step of heating, on both sides, i.e. with the main body and the fusion-weldable attachment layer. As a result, provision is therefore made of an attachment layer on the component which, on the one hand, is integrally connected to the component without forming a brittle phase and to which, on the other hand, a steel shaft can be connected very effectively by fusion welding.

It is furthermore advantageous if the first alloy is a titanium-aluminum base alloy and the second alloy is a vanadium (V) base alloy. Since titanium-aluminum base alloys are distinguished by a low density and a high specific strength, and vanadium base alloys are very readily fusion-weldable, in particular to a steel shaft, it is thereby possible to provide a rotor wheel which can be connected very easily and cost-effectively to a steel shaft by means of fusion welding.

Moreover, it is advantageous if the barrier layer is designed to prevent diffusion of the atoms of the first alloy of the main body to the atoms of the second alloy of the fusion-weldable attachment layer. In other words, that is to say that the barrier layer can have a diffusion coefficient which is configured to prevent diffusion of the atoms of the first alloy of the main body to the atoms of the second alloy of the fusion-weldable attachment layer. The barrier layer can therefore be in the form of a diffusion barrier for the atoms of the first alloy. This measure can effectively prevent a situation in which an intensive concentration equalization of the types of atom takes place and as a result an indefinite proportion of the atoms of the first alloy, for example of the components titanium and aluminum, passes into the fusion-weldable attachment layer, which would impair or even prevent weldability by means of fusion welding methods. The background here is that the sintering of, for example, TiAl base alloys is effected at temperatures above 1400° C. At these very high temperatures, an intensive concentration equalization of the types of atom takes place through interdiffusion during co-sintering of different metallic alloys. Therefore, a metallic intermediate layer produced by co-sintering at the welded joint would always contain a certain proportion of the components titanium and aluminum from the rotor wheel, which would prevent a satisfactory use of fusion welding methods.

It is furthermore advantageous if the barrier layer is designed to prevent diffusion of the atoms of the second alloy of the fusion-weldable attachment layer to the atoms of the first alloy of the main body. In other words, that is to say that the barrier layer can have a diffusion coefficient which is configured to additionally prevent diffusion of the atoms of the second alloy of the fusion-weldable attachment layer to the atoms of the first alloy of the main body. This measure prevents a situation in which atoms of the attachment layer reach the connection region between the main body and the barrier layer in an uncontrolled manner, which would impair the integral connection between the barrier layer and the main body.

Moreover, it is advantageous if the barrier layer comprises an oxidic ceramic. In this respect, it is particularly advantageous if the oxidic ceramic of the barrier layer is zirconium dioxide with the general chemical formula $ZrO_{2-\delta}$ where $\delta$ is in the range of greater than or equal to 0 to less than or equal to 0.5. The thickness of the ceramic barrier layer or diffusion barrier can in this case lie in a range of 0 to 2 mm. This measure can ensure that there is a fixed connection between the zirconium dioxide and the two alloys, i.e. in particular the TiAl base alloy and the V base alloy. As an alternative or in addition, the oxidic ceramic can comprise yttrium oxide or magnesium oxide in the range of greater than or equal to 0 to less than or equal to 10% by mass for stabilization.

It is furthermore advantageous if the fusion-weldable attachment layer additionally comprises nickel. Through the addition of nickel, for example in the range of greater than or equal to 5 to less than or equal to 30% by mass, the melting and sintering behavior of the second alloy, which is preferably a V base alloy, can be adapted to the first alloy, which is preferably a TiAl base alloy, of the rotor wheel.

Furthermore, it is advantageous if the fusion-weldable attachment layer additionally comprises zirconium and/or titanium and/or provision is made between the barrier layer and the fusion-weldable attachment layer of an intermediate layer, which comprises zirconium and/or titanium and in the step of heating is connected to the fusion-weldable attachment layer and the barrier layer. The two reactive metallic elements zirconium and titanium can in this case be added in a range of greater than or equal to 0 to less than or equal to 5% by mass. The attachment layer can have a thickness of 0.1 to 5 mm, for example. The intermediate layer can have a thickness of 0 to 0.5 mm, for example. The provision of the reactive elements zirconium and/or titanium on the one hand ensures the formation of an integral connection with the preferably ceramic barrier layer or diffusion barrier during the heating. On the other hand, the V base alloy can furthermore be connected very easily to a steel shaft by fusion welding.

It is furthermore advantageous if, before the step of heating, the main body is a green body and the fusion-weldable attachment layer, the barrier layer and if appropriate the intermediate layer are applied to the main body by means of injection molding and/or a spraying or printing method, for example tampo printing, inkjet printing or screen printing, and, in the step of heating, the green body, the fusion-weldable attachment layer, the barrier layer and if appropriate the intermediate layer are co-sintered.

Alternatively, before the step of heating, the main body can be present in a sintered state and the barrier layer, the fusion-weldable attachment layer and if appropriate the intermediate layer can be applied to the main body by means of a thermal spraying method, for example plasma spraying, powder flame spraying, high-velocity flame spraying, cold spraying or arc wire spraying.

Moreover, it is advantageous if, before the step of heating, the main body and the barrier layer are present in a sintered state and the fusion-weldable attachment layer is present in a sintered state or in a state produced by melt metallurgy. Within the context of the present disclosure, a sintered state means that the object has already been fully sintered even before the subsequent step of heating and therefore does not have to undergo a further sintering process.

These measures make it possible to provide a fusion-weldable rotor wheel in a very cost-effective and efficient manner in a variety of ways.

BRIEF DESCRIPTION OF THE DRAWINGS

The disclosure will be explained in more detail by way of example hereinbelow with reference to the appended drawings, in which.

DETAILED DESCRIPTION

In the following description of preferred exemplary embodiments of the present disclosure, identical or similar reference signs are used for the elements of similar action shown in the various figures, with a repeated description of these elements being dispensed with.

Figure 1:
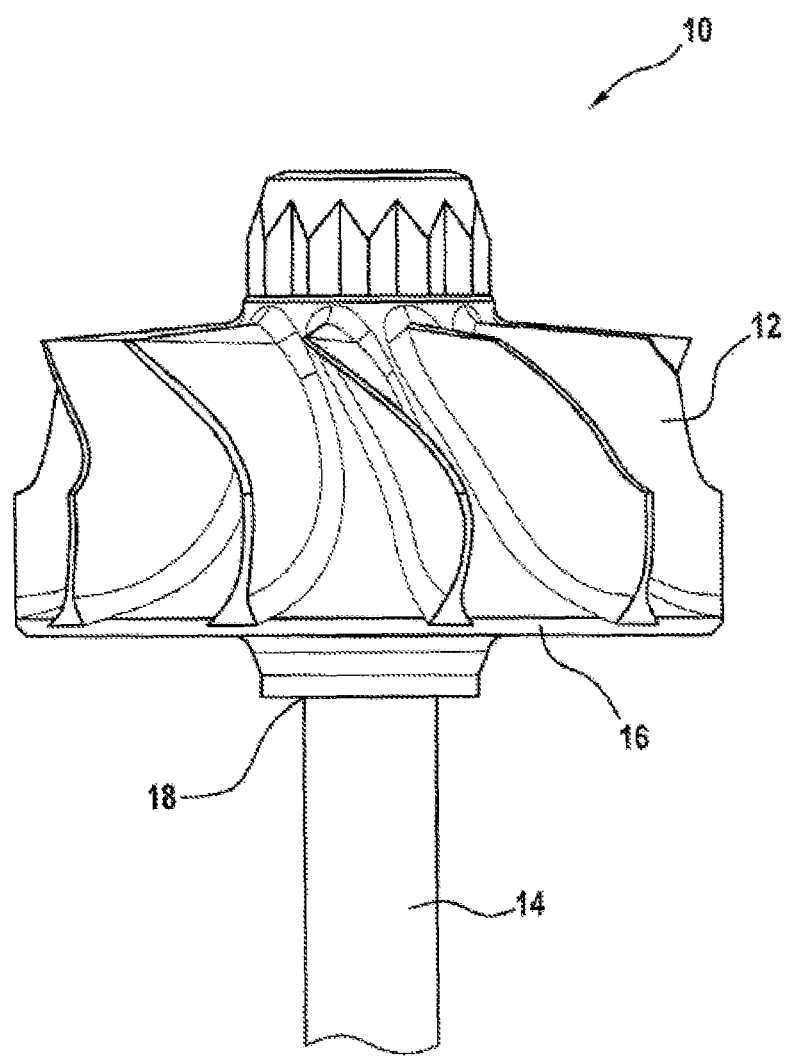
FIG. 1 shows a schematic illustration of a rotor according to the disclosure, which has been produced by the method according to the disclosure.

In FIG. 1, a component composite according to the disclosure is denoted in its entirety by the reference sign 10. The component composite 10 is in this case in the form of a rotor 10. The rotor 10 has a component 12, which is in the form of a rotor wheel. The rotor 10 furthermore has a shaft 14, which is in the form of a steel shaft 14.

The rotor wheel 12 has a main body 16, which is connected to the steel shaft 14 via an attachment region 18. The connection between the rotor wheel 12 and the steel shaft 14 has been established here by means of a fusion welding method. The rotor wheel 12 or the main body 16 comprises a first alloy at the attachment region 18. The main body 16 of the rotor wheel 12 can also consist entirely of the first alloy. The first alloy can preferably be a titanium-aluminum base alloy.

Figure 2:
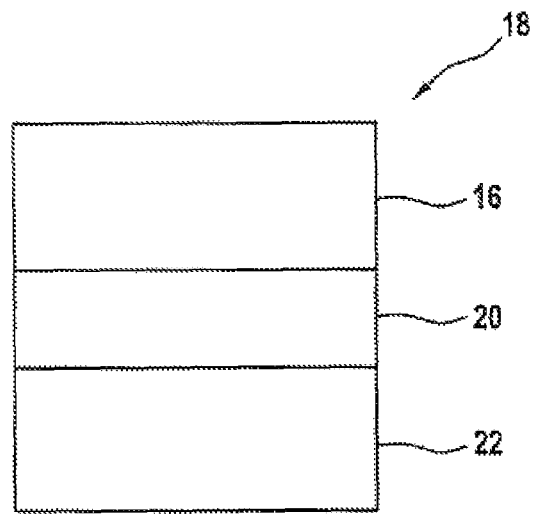
FIG. 2 shows a schematic detailed view of the attachment region of a first embodiment of the rotor wheel according to the disclosure.

In order to then be able to cost-effectively and reliably attach a rotor wheel 16 of this type, which is distinguished in particular by a low density and a high specific strength, to a steel shaft, the rotor wheel 16 furthermore has, according to the disclosure, a barrier layer 20 and an attachment layer 22, which are shown in more detail in FIG. 2, at the attachment region 18.

It can be seen from FIG. 2 that provision is made in the attachment region 18 of the main body 16 of a barrier layer 20, which is preferably arranged directly on the main body 16. The barrier layer 20 can have a thickness of between 0 and 2 mm. On that side of the barrier layer 20 which lies opposite the main body 16, provision is made of the fusion-weldable attachment layer 22, which is preferably arranged directly on the barrier layer 20. The fusion-weldable attachment layer 22 can have a thickness of between 0.1 and 5 mm. The fusion-weldable attachment layer 22 comprises a second alloy, which differs from the first alloy. The second alloy is preferably a V base alloy.

According to the disclosure, the barrier layer 20 is therefore arranged between the main body 16 and the fusion-weldable attachment layer 22 and is designed in such a manner as to prevent a reaction of the first alloy of the main body 16 with the second alloy of the fusion-weldable attachment layer 22 during a thermal treatment, for example during a sintering operation or any other heating step. The barrier layer 20 can in this case preferably be configured in such a way as to prevent diffusion of the first alloy of the main body 16 to the atoms of the second alloy of the fusion-weldable attachment layer 22 during the thermal treatment. The barrier layer 20 is therefore in the form of a diffusion barrier 20. Furthermore, the barrier layer 20 can additionally be configured in such a way as to prevent diffusion of the atoms of the second alloy of the fusion-weldable attachment layer 22 to the atoms of the first alloy of the main body 16 during the thermal treatment, in particular a sintering operation. Accordingly, by way of example, the barrier layer 20 can have a diffusion coefficient which is configured to prevent diffusion of the atoms of the first alloy of the main body 16 to the atoms of the second alloy of the fusion-weldable attachment layer 22 and if appropriate also vice versa during a thermal treatment. In the present case, the barrier layer 20 consists of zirconium dioxide with the general chemical formula $ZrO_{2-\delta}$, where $\delta$ is in the range of greater than or equal to 0 to less than or equal to 0.5. This can prevent a situation in particular in which titanium and/or aluminum atoms diffuse to the attachment layer 22 in an uncontrolled manner, which would lead to the formation of brittle phases and would therefore impair or even prevent weldability by fusion welding methods.

Figure 3:
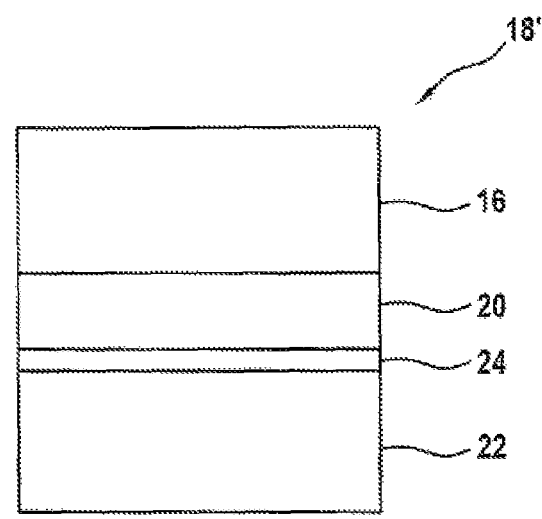
FIG. 3 shows a schematic illustration of the attachment region of a second embodiment of the rotor wheel according to the disclosure.

FIG. 3 shows the attachment region 18' of a further embodiment of the component 12 or rotor wheel 12 according to the disclosure. In contrast to the exemplary embodiment shown in FIG. 2, the rotor wheel 12 additionally has an intermediate layer 24. The intermediate layer 24 is arranged between the barrier layer 20 and the attachment layer 22. The intermediate layer can have a thickness of 0 to 0.5 mm. The intermediate layer 24 comprises titanium and/or zirconium. On the one hand, the intermediate layer 24 ensures the formation of an integral connection to the ceramic barrier layer 20 or diffusion barrier 20 during the co-sintering. On the other hand, the vanadium base alloy can furthermore be connected to the steel shaft by fusion welding.

Figure 4:
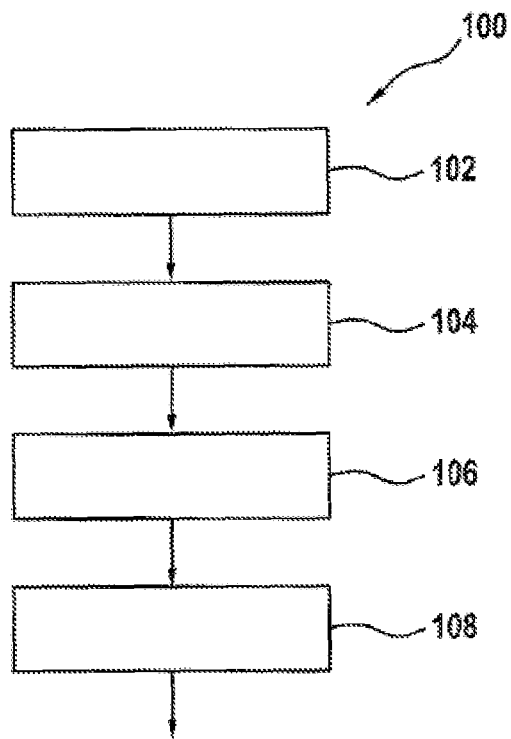
FIG. 4 shows a flow chart of a method for producing a component according to the disclosure.

FIG. 4 shows a flow chart of a method 100 for producing a component 12 according to the disclosure, in particular a rotor wheel 12. The method comprises a step of providing 102 the main body 16, a step of providing 104 a fusion-weldable attachment layer 22 in the attachment region 18 of the main body 16, a step of providing 106 a barrier layer 20 between the main body 16 and the fusion-weldable attachment layer 22 and a step of heating 108 the main body 16, the fusion-weldable attachment layer 22 and the barrier layer 20.

In the step of providing 102, provision is made of a main body 16 which comprises a first alloy at least in an attachment region 18; 18'. In the step of providing 104, provision is made of a fusion-weldable attachment layer 22 in the attachment region 18; 18' of the main body 16, said fusion-weldable attachment layer comprising a second alloy which differs from the first alloy. In the step of providing 106, provision is made of a barrier layer between the main body 16 and the fusion-weldable attachment layer 22, the barrier layer 20 being designed to prevent a reaction of the first alloy of the main body 16 with the second alloy of the fusion-weldable attachment layer 22 during a thermal treatment. In the step of heating 108, the main body 16, the barrier layer 20 and the fusion-weldable attachment layer 22 are heated, in order to connect the main body 16, the barrier layer 20 and the fusion-weldable attachment layer 22 to one another.

In one configuration of the method, in the step of providing 102, the main body 16 can be a green body 16. In the steps of providing 104 and 106, it is then possible for the barrier layer 20, the fusion-weldable attachment layer 22 and if appropriate the intermediate layer 24 to be applied to the green body 16 by means of injection molding and/or a spraying or printing method. In the step of heating 108, the green body 16, the barrier layer 20, the fusion-weldable attachment layer 22 and if appropriate the intermediate layer 24 can then be co-sintered.

In a further configuration of the method 100, in the step of providing 102, the main body 16 can already be present in a fully sintered state. In the step of providing 104 and 106, it is then possible for the barrier layer 20, the fusion-weldable attachment layer 22 and if appropriate the intermediate layer 24 to be applied to the sintered main body 16 by means of a thermal spraying method. Then, in the step of heating 108, it is then possible for the sintered main body 16, the barrier layer 20, the fusion-weldable attachment layer 22 and if appropriate the intermediate layer 24 to be connected to one another by a subsequent heat treatment.

In a further configuration of the method 100 according to the disclosure, in the steps of providing 102 and of providing 106, the main body 16 and the barrier layer 20 can already be present in a fully sintered state. In the step of providing 104, it is then possible for the fusion-weldable attachment layer 22 to be present in a sintered state or in a state produced by melt metallurgy. In the step of heating 108, it is then possible for the sintered main body 16, the sintered barrier layer 20, the sintered or melt-metallurgical attachment layer 22 and if appropriate the intermediate layer 24 to be connected to one another by means of a subsequent heat treatment.

Figure 5:
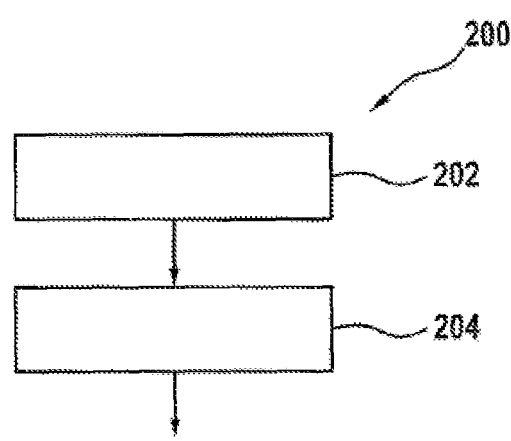
FIG. 5 shows a flow chart of a method for producing a component composite according to an exemplary embodiment of the present disclosure.

FIG. 5 shows a flow chart of a method 200 for producing a component composite 10, in particular a rotor 10, according to an exemplary embodiment of the present disclosure. The method 200 comprises a step of providing 202 the component 12 or rotor wheel 12 and a step 204 of fusion welding the shaft 14, in particular the steel shaft 14, to the component 12 or to the fusion-weldable attachment layer 22 of the component 12.

What is claimed is:
1. A method for producing a component, comprising:
positioning a main body including a first alloy disposed at least in an attachment region of the main body;
positioning a fusion-weldable attachment layer in the attachment region of the main body, the fusion-weldable attachment layer including a second alloy that differs from the first alloy;
positioning a barrier layer between the main body and the fusion-weldable attachment layer, the barrier layer configured to prevent a reaction of the first alloy of the main body with the second alloy of the fusion-weldable attachment layer during a thermal treatment; and
heating the main body, the barrier layer, and the fusion-weldable attachment layer to connect the main body, the barrier layer, and the fusion-weldable attachment layer to one another, wherein the first alloy is a titanium-aluminum base alloy and the second alloy is a vanadium base alloy.
2. The method according to claim 1, wherein the barrier layer is further configured to prevent diffusion of the atoms of the first alloy of the main body to the atoms of the second alloy of the fusion-weldable attachment layer during the heating.

3. The method according to claim 2, wherein the barrier layer is further configured to prevent diffusion of the atoms of the second alloy of the fusion-weldable attachment layer to the atoms of the first alloy of the main body during the heating.

4. The method according to claim 1, wherein the barrier layer comprises an oxidic ceramic.

5. The method according to claim 4, wherein the oxidic ceramic of the barrier layer is in the form of zirconium dioxide with the general chemical formula $ZrO_{2-\delta}$, where $\delta$ is in the range of greater than or equal to 0 to less than or equal to 0.5, and/or comprises yttrium oxide or magnesium oxide in the range of greater than or equal to 0 to less than or equal to 10% by mass.

6. The method according to claim 1, wherein the second alloy comprises nickel.

7. The method according to claim 1, wherein one or more of:
the second alloy comprises zirconium and/or titanium, and
an intermediate layer is positioned between the barrier layer and the fusion-weldable attachment layer, the intermediate layer including zirconium and/or titanium and, during the step of heating, the intermediate layer is connected to the fusion-weldable attachment layer and the barrier layer.

8. The method according to claim 7, wherein:
before the step of heating,
the main body is a green body, and
the barrier layer, the fusion-weldable attachment layer and the intermediate layer are applied to the green body by one or more of injection molding and a printing method; and
in the step of heating, the green body, the barrier layer, the fusion-weldable attachment layer and the intermediate layer are co-sintered.

9. The method according to claim 7, wherein, before the step of heating,
the main body is present in a sintered state; and
the barrier layer, the fusion-weldable attachment layer and the intermediate layer are applied to the main body by a thermal spraying method.

10. The method according to claim 1, wherein, before the step of heating,
the main body and the barrier layer are present in a sintered state; and
the fusion-weldable attachment layer is present in a sintered state or in a state produced by melt metallurgy.

11. The method according to claim 1, wherein the component is configured as a rotor wheel.

12. A method for producing a component, comprising:
positioning a main body including a first alloy disposed at least in an attachment region of the main body;
positioning a fusion-weldable attachment layer in the attachment region of the main body, the fusion-weldable attachment layer including a second alloy that differs from the first alloy;
positioning a barrier layer between the main body and the fusion-weldable attachment layer, the barrier layer configured to prevent a reaction of the first alloy of the main body with the second alloy of the fusion-weldable attachment layer during a thermal treatment; and
heating the main body, the barrier layer, and the fusion-weldable attachment layer to connect the main body, the barrier layer, and the fusion-weldable attachment layer to one another,
wherein
before the step of heating,
the main body is a green body, and
the barrier layer, the fusion-weldable attachment layer and the intermediate layer are applied to the green body by one or more of injection molding and a printing method, and
in the step of heating, the green body, the barrier layer, the fusion-weldable attachment layer and the intermediate layer are co-sintered, and
wherein one or more of:
the second alloy comprises zirconium and/or titanium, and
an intermediate layer is positioned between the barrier layer and the fusion-weldable attachment layer, the intermediate layer including zirconium and/or titanium and, during the step of heating, the intermediate layer is connected to the fusion-weldable attachment layer and the barrier layer.

13. The method according to claim 12, wherein the first alloy is a titanium-aluminum base alloy.

14. The method according to claim 12, wherein the second alloy is a vanadium base alloy.

15. The method according to claim 12, wherein the barrier layer is further configured to prevent diffusion of the atoms of the first alloy of the main body to the atoms of the second alloy of the fusion-weldable attachment layer during the heating.

16. The method according to claim 15, wherein the barrier layer is further configured to prevent diffusion of the atoms of the second alloy of the fusion-weldable attachment layer to the atoms of the first alloy of the main body during the heating.

17. The method according to claim 12, wherein the barrier layer comprises an oxidic ceramic.

18. The method according to claim 17, wherein the oxidic ceramic of the barrier layer is in the form of zirconium dioxide with the general chemical formula $ZrO_{2-\delta}$, where $\delta$ is in the range of greater than or equal to 0 to less than or equal to 0.5, and/or comprises yttrium oxide or magnesium oxide in the range of greater than or equal to 0 to less than or equal to 10% by mass.

19. A method for producing a component, comprising:
positioning a main body including a first alloy disposed at least in an attachment region of the main body;
positioning a fusion-weldable attachment layer in the attachment region of the main body, the fusion-weldable attachment layer including a second alloy that differs from the first alloy;
positioning a barrier layer between the main body and the fusion-weldable attachment layer, the barrier layer configured to prevent a reaction of the first alloy of the main body with the second alloy of the fusion-weldable attachment layer during a thermal treatment; and
heating the main body, the barrier layer, and the fusion-weldable attachment layer to connect the main body, the barrier layer, and the fusion-weldable attachment layer to one another, wherein
the barrier layer comprises an oxidic ceramic in the form of zirconium dioxide with the general chemical formula $ZrO_{2-\delta}$, where $\delta$ is in the range of greater than or equal to 0 to less than or equal to 0.5, and/or comprises yttrium oxide or magnesium oxide in the range of greater than or equal to 0 to less than or equal to 10% by mass.

20. The method according to claim 1, wherein:

the second alloy comprises zirconium and/or titanium, and an intermediate layer is positioned between the barrier layer and the fusion-weldable attachment layer, the intermediate layer including zirconium and/or titanium and, during the step of heating, the intermediate layer is connected to the fusion-weldable attachment layer and the barrier layer.

\* \* \* \* \*